O. H. JOBSKI.
RIM.
APPLICATION FILED JULY 17, 1919.
1,372,231. Patented Mar. 22, 1921.
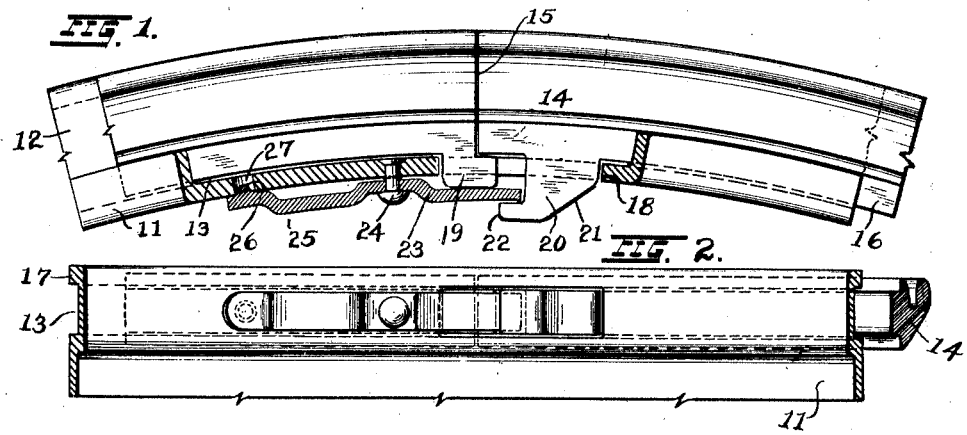
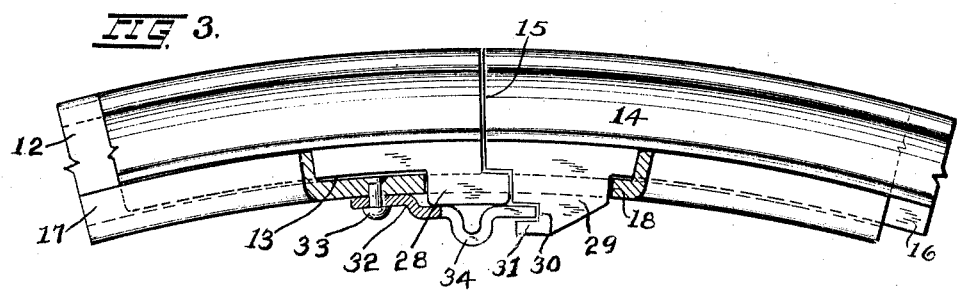
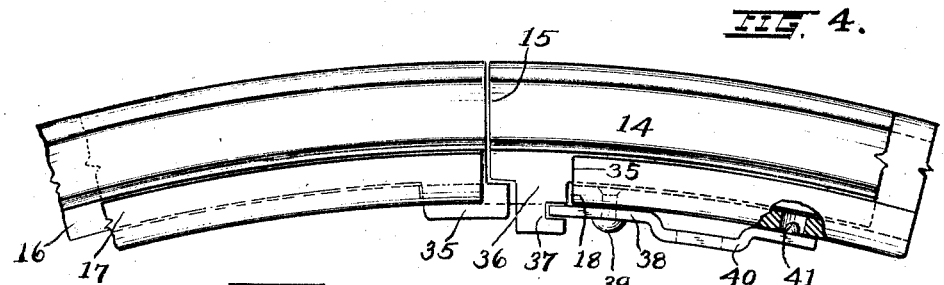
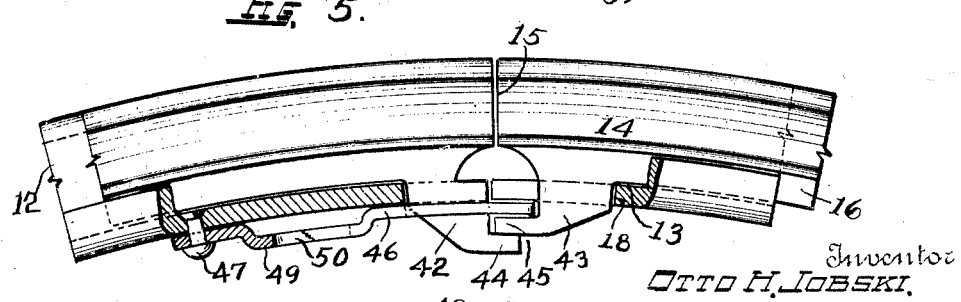
Inventor
OTTO H. JOBSKI.
by B. McKent
Attorney

UNITED STATES PATENT OFFICE.

OTTO H. JOBSKI, OF CLEVELAND, OHIO, ASSIGNOR TO THE STANDARD PARTS COMPANY, OF CLEVELAND, OHIO, A CORPORATION OF OHIO.

RIM.

1,372,231.   Specification of Letters Patent.   Patented Mar. 22, 1921.

Application filed July 17, 1919. Serial No. 311,496.

*To all whom it may concern:*

Be it known that I, OTTO H. JOBSKI, a citizen of the United States, and a resident of Cleveland, county of Cuyahoga, State of Ohio, have invented certain new and useful Improvements in Rims, of which the following is a specification.

This invention relates to rims for vehicle wheels and more particularly to rims of the so-called quick-detachable type in which a side ring is detachably seated at one edge thereof, to facilitate the removal and replacing of a tire on the rim, and has for one of its objects the provision of a simple and effective means for holding the side ring in seated position upon the rim.

Other objects of the invention and the features of novelty will be apparent from the following description, taken in connection with the accompanying drawings, in which:—

Figure 1 is a fragmentary side elevation of a rim embodying my invention, part of the rim being broken away at one point to more clearly disclose the structure;

Fig. 2 is a fragmentary bottom plan view of the structure shown in Fig. 1;

Figs. 3, 4 and 5 are fragmentary side elevations similar to Fig. 1, showing modified structures embodying my invention; and Fig. 6 is a bottom plan view of the latch shown in Fig. 5.

In the drawings, 11 indicates a vehicle wheel rim having a tire-retaining flange 12 at one edge thereof, and a circumferential channel or groove 13 adjacent its other edge to receive a side ring 14 which is transversely split at 15 and is adapted to be detachably seated on the rim. A web 16 extends inwardly from the side ring 14 and enters the groove 13 to hold the ring from lateral motion on the rim, the ring being sufficiently resilient to permit the webs 16 to be lifted over the side wall 17 of the groove 13. The rim is cut away at one point at the bottom of the groove 13 to provide an aperture 18 and lugs are formed on the side ring 14 adjacent its ends and extend through the aperture 18, one of the lugs extending across the split 15 so as to be held in place by the other end of the ring. The lug on the other end of the ring is adapted to be engaged by a latch which, in one position, interlocks therewith to hold the overlapping end of the ring, and hence the overlapped end thereof, from moving radially outwardly.

In the structure shown in Figs. 1 and 2, the lug 19 on one end of the side ring 14 extends inwardly from the web 16 and extends forwardly beyond the end of the side ring so as to be overlapped by the web at the other end of the side ring, and held thereby from moving out of the aperture 18. The lug 20 adjacent the other end of the side ring extends inwardly from the web 16 and has its rear face inclined inwardly and forwardly, as shown at 21, for a purpose which will be described later. A forwardly projecting toe 22 is formed on the lug 20, and a latch 23, pivotally mounted on the rim 11 by a rivet 24, or in any other suitable manner, is adapted to be swung so that the end thereof will interlock with the toe 22 to hold the lug 20 from moving out of the aperture 18. The latch 23 may be formed of stock metal of uniform thickness, deflected away from the rim at one point, as shown at 24, to provide a projection for engagement by an operating tool, and formed with a boss or projection 26 which is adapted to enter an opening 27 in the rim, to hold the latch in locking position.

In the modified structure shown in Fig. 3, the lug 28 is identical with the lug 19 of the structure shown in Fig. 1, and the locking lug 29 is similar to the lug 20, the body of the lug being transversely slotted at 30 to form a forwardly projecting toe 31. A latch 32 is pivotally mounted on the rim by a rivet 33 and is adapted to have the end thereof interlock with the toe 31, the latch being bent between its pivot and its interlocking end to form a projection 34 for engagement by an operating tool.

In the modified structure shown in Fig. 4, the lug 35 on one end of the side ring is formed so as to be overlapped by the web at the other end of the side ring, as in the structures already described. The side wall 17 of the channel is cut away to form an opening 35 which communicates with the aperture 18, so as to permit the lug 36 on the other end of the side ring to be moved laterally into position in the aperture 18, thus rendering it unnecessary for the side ring to be expanded sufficiently to lift the lug 36 over the side wall 17. The lug 36 is formed with a transverse slot 37 at its rear edge, and a latch 38 is pivotally mounted on the rim, as by a rivet 39, so that the end thereof can engage in the slot 37 to lock the lug against radially outward motion, the latch being preferably formed with a deflected portion 40 and a boss 41 similar to those of the latch 26 shown in Fig. 1, and for the same purpose.

In the modified structure shown in Figs. 5 and 6, the lugs 42 and 43 on the ends of the side ring 14, extend through the aperture 18, and are provided with toes 44 and 45, respectively, which project from the lugs below the rim. The toe 44 on the lug 42 extends circumferentially beyond the end of the side ring 14 and is overlapped by the toe 45 of the lug 43. A latch 46 is pivotally mounted on the rim, as by a rivet 47, and is provided with a lateral projection 48 thereon, which is adapted to enter between the lugs 42 and 43 and engage the upper surface of the overlapping toe 45 to hold the lugs seated in the aperture 18. The latch is preferably formed, as in the other modified structures illustrated, of stock metal deflected to form a projection 49 for engagement by an operating tool, and an opening 50 may be formed in the deflected portion to permit the insertion of a screw driver or other instrument therein, to further facilitate movement of the latch to or from locking position.

When it is desired to replace the side ring 14 upon the rim, the overlapped end of the ring is first seated, with the lug thereon in position in the aperture 18, and the ring is then progressively seated around the circumference of the rim until the locking lug at the other end of the ring registers with the aperture 18. If the ring is not completely contracted, the inclined rear face of the lug, as shown at 21 in the structure illustrated in Fig. 1, will facilitate the contraction of the ring and the seating of the lug in its aperture 18 by radially inward pressure on the ring, by reason of the engagement of such inclined face with the rim at the end of the aperture 18. The lugs 29 and 43, shown in Figs. 3 and 5, respectively, are formed with inclined rear faces similar to the face 21 of the lug 20 shown in Fig. 1, and for the same purpose, but it will be understood that such a formation of the lug is not necessary in the structure shown in Fig. 4, since the lug 36 is moved laterally into the aperture 18. In all of the structures illustrated, it will be noted that the lugs are formed with abrupt shoulders which engage with the rim at the ends of the aperture 18 to hold the ring from circumferential movement on the rim.

Having thus described my invention, what I claim is:—

1. The combination of a tire-carrying rim having a circumferential groove at one edge thereof, a transplit side ring detachably fitted to said rim and having a web thereon extending into said groove, a lug on one end of said ring extending radially inwardly from said web and having a part thereof overlapped by the other end of said ring, a lug extending inwardly from said web at the other end of said ring, and a latch pivoted to said rim and interlocking with said last-mentioned lug to hold the ends of said ring from radially outward motion.

2. The combination of a tire-carrying rim having a circumferential groove at one edge thereof and having a radial aperture therethrough, a transplit side ring detachably fitted to said rim and having a web thereon extending into said groove, lugs extending inwardly from said web adjacent the ends of said ring and having shoulders thereon coöperating with said rim at the ends of said aperture to hold said ring from circumferential motion on said rim, one of said lugs extending across the split in said ring and overlapped by the other end thereof, and the other of said lugs having a circumferentially projecting toe, and a latch pivoted to said rim and having its end, in one position thereof, interlocking with said toe to hold said ring in seated position.

3. The combination of a tire-carrying rim having a circumferential groove at one edge thereof and having a radial aperture therethrough, a transplit side ring detachably fitted to said rim and having a web thereon extending into said groove, lugs carried by said ring adjacent the ends thereof extending through said aperture, said lugs having oppositely extending toes thereon, one of said toes being adapted to overlap the other, and means adapted in one position to interlock with said overlapping toe between said lugs to hold said ring in seated position.

4. The combination of a tire-carrying rim having a circumferential groove at one edge thereof and having a radial aperture therethrough, a transplit side ring detachably fitted to said rim and having a web thereon extending into said groove, lugs carried by said ring adjacent the ends thereof extending through said aperture, said lugs having oppositely extending toes thereon, one of said toes being adapted to overlap the other, and a latch member pivoted to said rim and having a portion thereof adapted, in one position, to extend between said overlapping toe and said rim to hold said ring in seated position.

In testimony whereof I affix my signature.

OTTO H. JOBSKI.